(12) United States Patent
Olson et al.

(10) Patent No.: US 11,200,103 B2
(45) Date of Patent: Dec. 14, 2021

(54) USING A MACHINE LEARNING MODULE TO PERFORM PREEMPTIVE IDENTIFICATION AND REDUCTION OF RISK OF FAILURE IN COMPUTATIONAL SYSTEMS

(71) Applicant: INTERNATIONAL BUSINESS MACHINES CORPORATION, Armonk, NY (US)

(72) Inventors: James E. Olson, Oxford, CT (US); Micah Robison, Tucson, AZ (US); Matthew G. Borlick, Tucson, AZ (US); Lokesh M. Gupta, Tucson, AZ (US); Richard P. Oubre, Jr., San Jose, CA (US); Usman Ahmed, Islamabad (PK); Richard H. Hopkins, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 16/172,455

(22) Filed: Oct. 26, 2018

(65) Prior Publication Data
US 2020/0133753 A1    Apr. 30, 2020

(51) Int. Cl.
*G06F 11/00*    (2006.01)
*G06N 3/08*    (2006.01)
(Continued)

(52) U.S. Cl.
CPC .......... *G06F 11/008* (2013.01); *G06F 11/004* (2013.01); *G06N 3/084* (2013.01); *G06N 5/046* (2013.01); *G06N 20/00* (2019.01)

(58) Field of Classification Search
CPC ..... G06F 11/008; G06F 11/004; G06N 20/00; G06N 3/084; G06N 5/046
See application file for complete search history.

(56) References Cited

U.S. PATENT DOCUMENTS 7,506,213 B1    3/2009    Cabrera, III et al.
7,509,415 B2    3/2009    Baekelmans et al.
(Continued)

FOREIGN PATENT DOCUMENTS

WO    WO2018005012    1/2018

OTHER PUBLICATIONS

"Version above or later",Feb. 2017, english.stackexchange.com (Year: 2017).*

(Continued)

*Primary Examiner* — Bryce P Bonzo
*Assistant Examiner* — Michael Xu
(74) *Attorney, Agent, or Firm* — Konrad Raynes Davda & Victor LLP; Rabindranath Dutta

(57) ABSTRACT

Input on a plurality of attributes of a computing environment is provided to a machine learning module to produce an output value that comprises a risk score that indicates a likelihood of a potential malfunctioning occurring within the computing environment. A determination is made as to whether the risk score exceeds a predetermined threshold. In response to determining that the risk score exceeds a predetermined threshold, an indication is transmitted to indicate that potential malfunctioning is likely to occur within the computing environment. A modification is made to the computing environment to prevent the potential malfunctioning from occurring.

18 Claims, 11 Drawing Sheets

(51) Int. Cl.
*G06N 5/04* (2006.01)
*G06N 20/00* (2019.01)

(56) References Cited

U.S. PATENT DOCUMENTS

| | | | |
|---|---|---|---|
| 8,631,117 | B2 | 1/2014 | Marvasti |
| 9,852,524 | B2 | 12/2017 | Ricci |
| 2007/0005761 | A1 | 1/2007 | Wolters |
| 2013/0010610 | A1 | 1/2013 | Karthikeyan et al. |
| 2015/0271008 | A1 | 9/2015 | Jain et al. |
| 2017/0048109 | A1* | 2/2017 | Kant ............... H04L 41/147 |
| 2018/0114175 | A1* | 4/2018 | Fei ............... G06F 16/2291 |
| 2018/0287856 | A1* | 10/2018 | Whitner ............... H04L 41/0695 |
| 2020/0058034 | A1* | 2/2020 | Sloane ............... G06Q 30/0185 |
| 2020/0104200 | A1* | 4/2020 | Kocberber ............... G06F 17/18 |
| 2020/0133820 | A1 | 4/2020 | Olson et al. |
| 2020/0278273 | A9* | 9/2020 | Shapiro ............... G07C 5/0825 |

OTHER PUBLICATIONS

Alan Henry, "how long will my hard drives really last", Apr. 2015, lifehacker.com (Year: 2015).*
"RAID", Feb. 2017, Wikipedia.org (Year: 2017).*
"Network monitoring", Feb. 2017, Wikipedia.org (Year: 2017).*
"Supervised learning", Feb. 2017, Wikipedia.org (Year: 2017).*
A Banerjee, "Advanced-predictive-netowrk-analytics-optimize-your-network-investments", SAS, White Paper, Feb. 2014, pp. 17.
U.S. Appl. No. 16/172,475, filed Oct. 26, 2018.
List of IBM patents and applications treated as related, dated Oct. 26, 2018, pp. 2.
Office action dated Apr. 22, 2020, pp. 26, for U.S. Appl. No. 16/172,475.
Y. Xu, et al., "Improving Service Availability of Cloud Systems by Predicting Disk Error", USENIX, Proceedings of the 2018 USENIX Annual Technical Conference, Jul. 2018, pp. 14.
"Artifical Neural Network", Wikipedia, Jun. 2004, pp. 20.
"Backpropogation", Wikipedia, Feb. 2004, pp. 12.
Response dated Jul. 22, 2020, pp. 12, to Office Action dated Apr. 22, 2020, pp. 26, for U.S. Appl. No. 16/172,475.
Final Office Action dated Sep. 29, 2020, pp. 33, for U.S. Appl. No. 16/172,475.
Amendment dated Dec. 29, 2020, pp. 12, to Final Office Action dated Sep. 29, 2020, pp. 33, for U.S. Appl. No. 16/172,475.
Office Action dated May 5, 2021, pp. 23, for U.S. Appl. No. 16/172,475.
Response dated Jul. 27, 20201, p. 9, to Office Action dated May 5, 2021, p. 23, for U.S. Appl. No. 16/172,475.
Notice of Allowance dated Oct. 1, 2021, p. 17, for U.S. Appl. No. 16/172,475.

* cited by examiner

USING A MACHINE LEARNING MODULE TO PERFORM PREEMPTIVE IDENTIFICATION AND REDUCTION OF RISK OF FAILURE IN COMPUTATIONAL SYSTEMS

BACKGROUND

1. Field

Embodiments relate to using a machine learning module to perform preemptive identification and reduction of risk of failure in computational systems.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts. A plurality of such storage controllers, hosts, and other computational devices may be deployed at one or more sites to provide an environment for storage and management of data and also to provide an environment for data processing.

Artificial neural networks (also referred to as neural networks) are computing systems that may have been inspired by the biological neural networks that constitute animal brains. Neural networks may be configured to use a feedback mechanism to learn to perform certain computational tasks. Neural networks are a type of machine learning mechanism.

SUMMARY OF THE PREFERRED EMBODIMENTS

Provided are a method, system, and computer program product in which input on a plurality of attributes of a computing environment is provided to a machine learning module to produce an output value that comprises a risk score that indicates a likelihood of a potential malfunctioning occurring within the computing environment. A determination is made as to whether the risk score exceeds a predetermined threshold. In response to determining that the risk score exceeds a predetermined threshold, an indication is transmitted to indicate that potential malfunctioning is likely to occur within the computing environment. A modification is made to the computing environment to prevent the potential malfunctioning from occurring. As a result, the likelihood of failures in a computing environment are determined and remedial measures taken.

In certain embodiments, the indication further identifies a level of severity of the potential malfunctioning. As a result, the severity of potential failures in a computing environment is known prior to their occurrence.

In additional embodiments, the computing environment comprises one or more devices comprising one or more storage controllers, one or more storage drives, and one or more host computing systems, wherein the one or more storage controllers manage the storage drives to allow input/output (I/O) access to the one or more host computing systems. As a result, preemptive reduction in the risk of failure is performed in storage systems.

In further embodiments, an attribute of the plurality of attributes is a measure of a firmware or software level of a device in comparison to a minimum or recommended firmware or software level for the device. As a result, the impact of wrong firmware level on the likelihood of failures is determined.

In certain embodiments, the plurality of attributes are based on whether a device has reached an end of life cycle, and a ratio of faulty replaced drives to total number of drives over a period of time. As a result, the impact of life cycle of devices and faulty drives on the likelihood of failures is determined.

In further embodiments, an attribute is based on a level of redundancy in the computing environment indicated by Redundant Array of Independent Disks (RAID) configurations. As a result, the impact of redundancy on the likelihood of failures is determined.

In certain embodiments, the plurality of attributes indicate: whether critical policy failures have occurred in the computing environment; whether one or more devices have missed heartbeats, an age of a device; and problems identified with a device. As a result, the impact of many different inputs on the likelihood of failures is determined.

In further embodiments, the machine learning module is configured to receive the input on the plurality of attributes of the computing environment, wherein the machine learning module is trained to adjust weights within the machine learning module, in response to events occurring in the computing environment, and wherein the events are associated with an expected output value of the machine learning module. As a result, the machine learning module is trained to improve its operation.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Failures or problems may occur in a computing environment comprising a plurality of computational devices and other devices. It is desirable to take proactive measures to prevent the failures or problems from occurring.

In certain embodiments, a machine learning module is used to determine proactively the failures and problems that are likely to occur in a computing environment. Measures are taken to prevent such failures and problems from occurring. In certain embodiments, a preemptive system risk identification and reduction mechanism uses a dynamic system scoring in a neural network. The neural network receives multiple inputs relating to the status of system operation and policy, and has an output that uses non-linear weighting of impact values and quantities of devices to generate a risk assessment number. The neural network is trained by actual input values derived from actual incidents that are rated by the type of incident. The neural network may continually be retrained to improve the predictive accuracy of determining the likelihood of failures and problems occurring m the computing environment by using a current state of operational parameters and feedback on actual experienced errors or lack of errors. As a result, improvements are made to the operations of computational devices and other devices to reduce failures and problems within a computing environment.

Exemplary Embodiments

Figure 1:
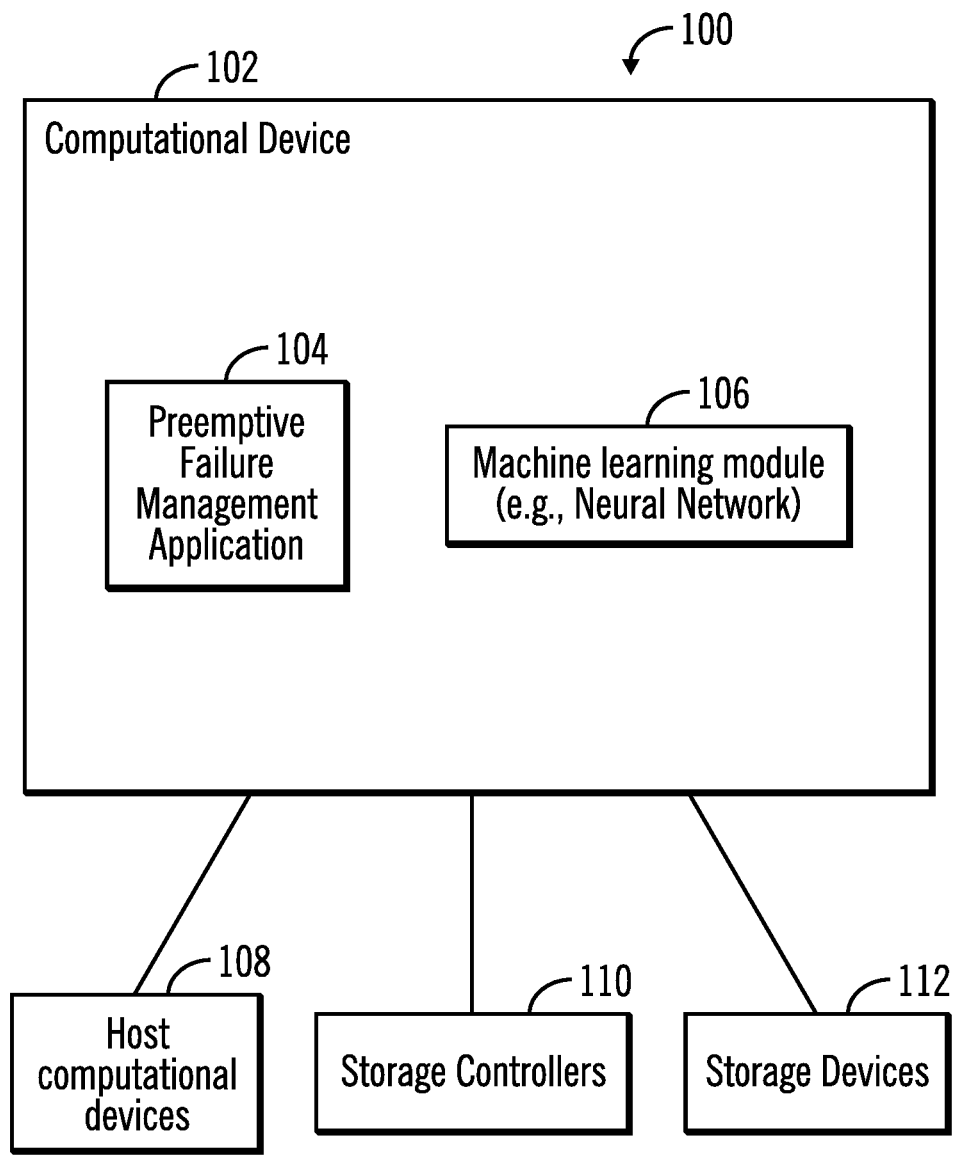
FIG. 1 illustrates a block diagram of a computing environment comprising a computational device in which a preemptive failure management application and a machine learning module are implemented, in accordance with certain embodiments.

FIG. 1 illustrates a block diagram of a computing environment 100 comprising a computational device 102 in which a preemptive failure management application 104 and a machine learning module 106 are implemented, in accordance with certain embodiments.

The computational device 102 is configured to receive data related to the operations of host computing devices 108, storage controllers 110, and storage devices 112 that are present in the computing environment 100. The storage controllers 110 allow the one or more hosts computing devices 108 to perform input/output (I/O) operations with logical storage maintained by the storage controllers 110. The physical storage corresponding to the logical storage may be found in one or more of the storage devices 112 and/or a cache of the storage controllers 110.

The computational device 102, the storage controllers 110 and the host computational devices 108 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The computational device 102, the storage controllers 110 and the host computational devices 108 may be elements in any suitable network, such as, a storage area network, a wide area network, the Internet, an intranet. In certain embodiments, computational device 102, the storage controllers 110 and the host computational devices 108 may be elements in a cloud computing environment.

The plurality of storage devices 112 may be comprised of any storage devices known in the art, such as solid state drives (SSD), hard disk drives (HDD), etc.

In certain embodiments, the preemptive failure management application 104 and the machine learning module 106 may be implemented in software, hardware, firmware or any combination thereof. The preemptive failure management application 104 uses the machine learning module 106 to determine the likelihood of failures and problems occurring in the host computational devices 108, storage controllers 110, and storage devices 112 of the computing environment 100 and sends indications for taking preventative measure to prevent such failures and problems.

In certain embodiments, the machine learning module 106 may implement a machine learning technique such as decision tree learning, association rule learning, neural network, inductive programming logic, support vector machines, Bayesian models, etc. In certain embodiments, the machine learning module 106 is a neural network.

Therefore, FIG. 1 illustrates certain embodiments in which a machine learning module 106 is used by a preemptive failure management application 104 to determine the likelihood of failures and problems occurring in the computing environment 100.

Figure 2:
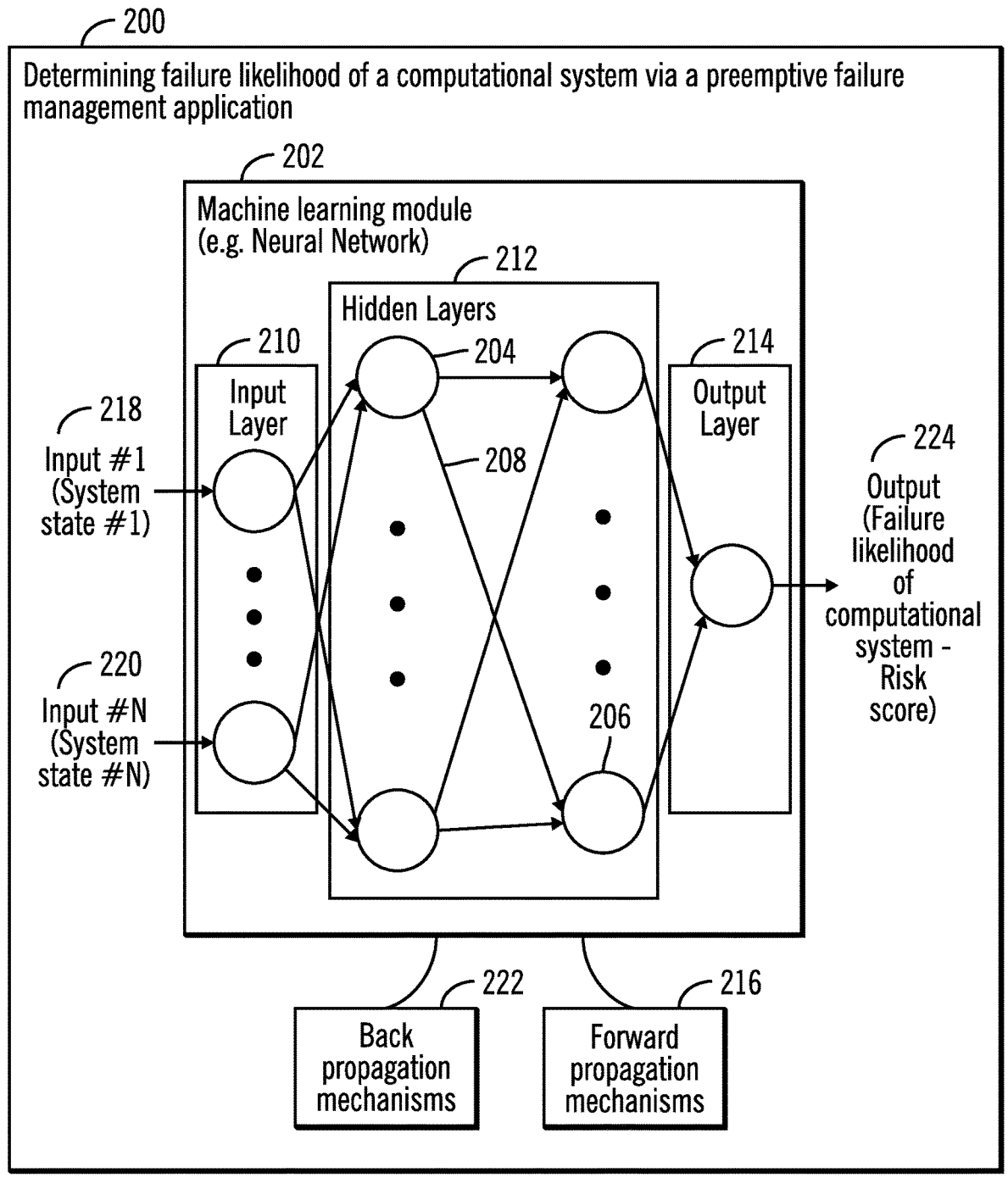
FIG. 2 illustrates a block diagram that shows a mechanism for detecting the failure likelihood of a computational system via the preemptive failure management application and a machine learning module comprising a neural network in accordance with certain embodiments.

FIG. 2 illustrates a block diagram 200 that shows a mechanism for detecting the likelihood of failure of a computational system via the preemptive failure management application 104 and a machine learning module 106 comprising a neural network 202, in accordance with certain embodiments.

The neural network 202 may comprise a collection of nodes with links connecting them, where the links are referred to as connections. For example, FIG. 2 shows a node 204 connected by a connection 208 to the node 206. The collection of nodes may be organized into three main parts: an input layer 210, one or more hidden layers, 212 and an output layer 214.

The connection between one node and another is represented by a number called a weight, where the weight may be either positive (if one node excites another) or negative (if one node suppresses or inhibits another). Training the neural network 202 entails calibrating the weights in the neural network 202 via mechanisms referred to as forward propagation 216 and back propagation 222. Bias nodes that are not connected to any previous layer may also be maintained in the neural network 202. A bias is an extra input of 1 with a weight attached to it for a node.

In forward propagation 216, a set of weights are applied to the input data 218, 220 to calculate an output 224. For the first forward propagation, the set of weights are selected randomly. In back propagation 222 a measurement is made the margin of error of the output 224 and the weights are adjusted to decrease the error. Back propagation 222 compares the output that the neural network 202 produces with the output that the neural network 202 was meant to produce, and uses the difference between them to modify the weights of the connections between the nodes of the neural network 202, starting from the output layer 214 through the hidden layers 212 to the input layer 210, i.e., going backward in the neural network. 202. In time, back propagation 222 causes the neural network 202 to learn, reducing the difference between actual and intended output to the point where the two exactly coincide. Thus, the neural network 202 is configured to repeat both forward and back propagation until the weights (and potentially the biases) of the neural network 202 are calibrated to accurately predict an output.

In certain embodiments, the plurality of inputs 218, 220 comprise a plurality of states of components of the computing environment 100. The output 224 may represent a risk score that provides a failure likelihood comprising the risk of failures and other problems in the computing environment 100.

Figure 3:
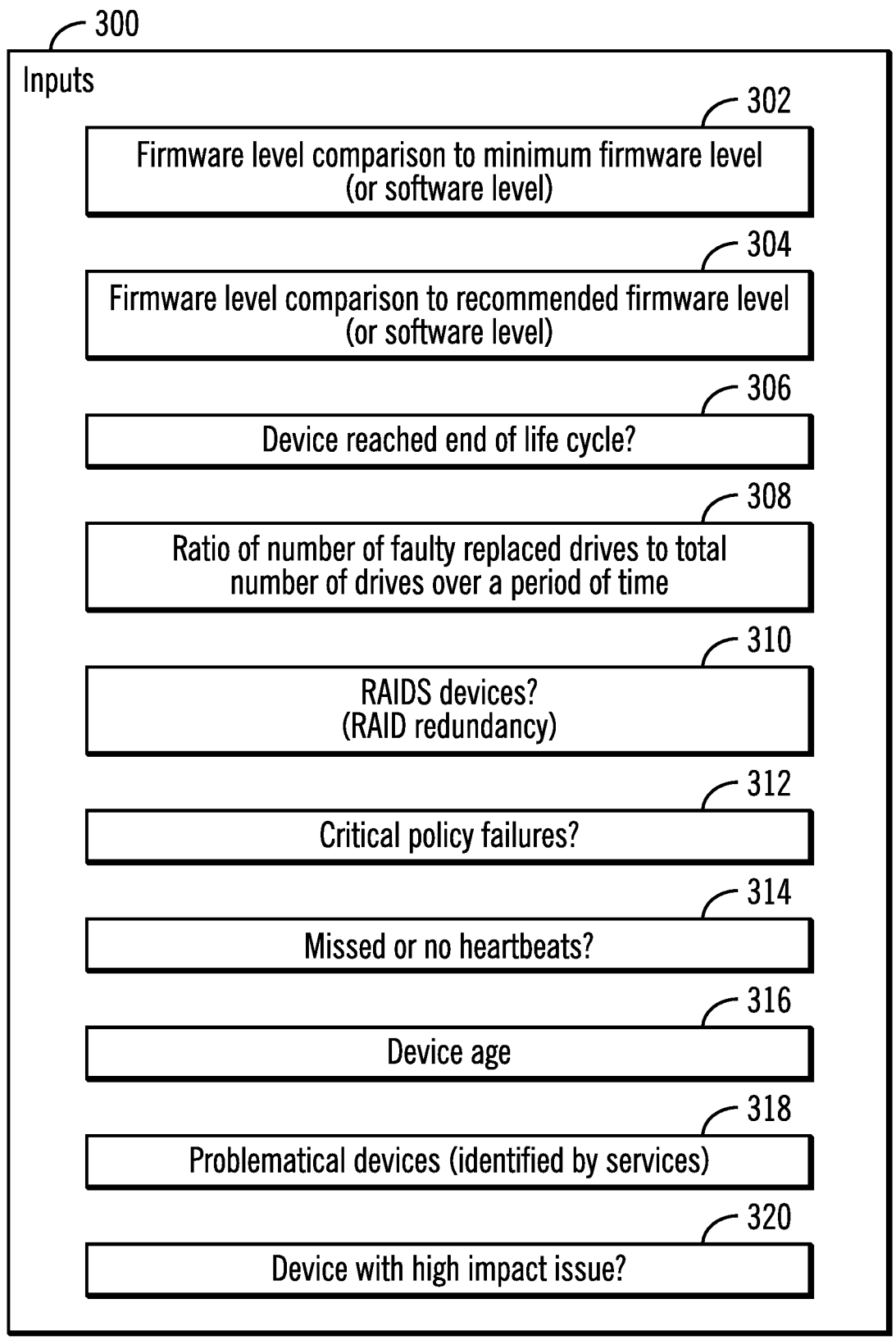
FIG. 3 illustrates a block diagram that shows exemplary inputs to the machine learning module, in accordance with certain embodiments.

FIG. 3 illustrates a block diagram that shows exemplar) inputs to the machine learning module comprising the neural network 106, in accordance with certain embodiments.

In certain embodiments an input to the neural network is a measure of a firmware or software level of a device (e.g., the devices 108, 110, 112) in comparison to a minimum or recommended firmware or software level for the device (as shown via reference numerals 302, 304). If the firmware or software level of the device is not at the recommended firmware level of the device or at least at the minimum firmware or software level of the device, then there is potential for failures or problems caused by the firmware or software level of the device. For example, if a device is many levels below the recommended or minimum firmware or software level then there may be a high likelihood for failures or problems caused by the device, and if a device is just one level below the recommended or minimum firmware or software level then there may be a small likelihood for failures or problems caused by the device.

In certain embodiments, the inputs are indicative of whether a device has reached an end of life cycle (as shown via reference numeral 306). For example, is a device has an end of life cycle of two years, then after two years of usage, the device is likely to be a cause of failure or problems.

In certain embodiments, the inputs are indicative of a ratio of faulty replaced drives to total number of drives over a period of time (as shown via reference numeral 308). The higher the ratio the higher may be the rate of failures and problems in the computing environment 100.

In certain embodiments, the inputs are indicative of a level of redundancy in the computing environment indicated by Redundant Array of Independent Disks (RAID) configurations (as shown via reference numeral 310). The less redundancy a RAID level provides, the more likely the loss of data, whereas the more redundancy a RAID level provides the more computations need to be performed for storing data.

In certain embodiments, the inputs are indicative of whether critical policy failures have occurred in the computing environment (as shown via reference numeral 312), number of devices that have missed heartbeats (as shown via reference numeral 314), an age of device (as shown via reference numeral 316), and number of problematical devices identified by service personnel (as shown via reference numeral 318). The inputs may also be indicative of devices that have high impact issues that may lead to a severe error condition to occur (as shown via reference numeral 320).

It should be noted that inputs shown in FIG. 3 are exemplary, and many additional types of inputs may be applied to the machine learning module comprising a neural network 106.

Figure 4:
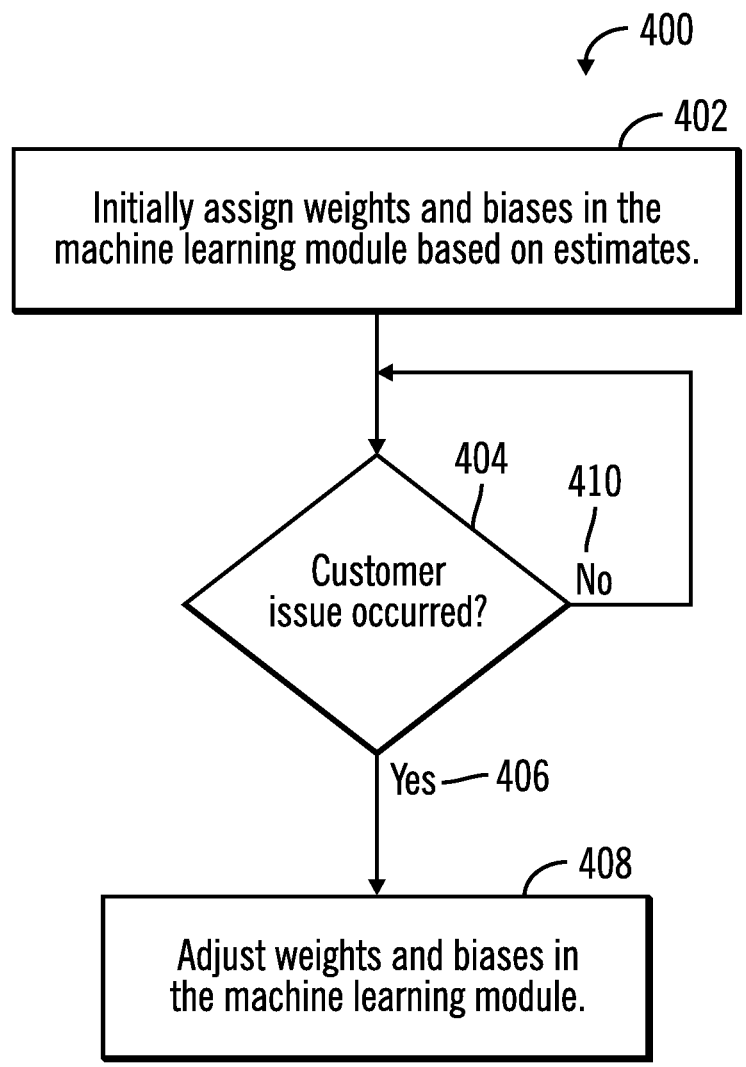
FIG. 4 illustrates flowchart that shows operations of the machine learning module, in accordance with certain embodiments.

FIG. 4 illustrates flowchart 400 that shows operations of the machine learning module 106, in accordance with certain embodiments.

Control starts at block 402 in which the preemptive failure management application 104 initially assigns weights and biases in the machine learning module 106 based on estimates. A determination is made at block 404 as to whether a customer issue (i.e., a problem or failure in the computing environment 100 that affects a customer) has occurred. If so ("Yes" branch 406), control proceeds to block 406 in which weights and biases are adjusted in the machine learning module 106. This is referred to as training the machine learning module 408 by adjustment of weights and biases so that learning occurs from the identified customer issue.

If at block 404 a determination is made that a customer issue has not occurred ("No" branch 410) then control returns to block 404.

Figure 5:
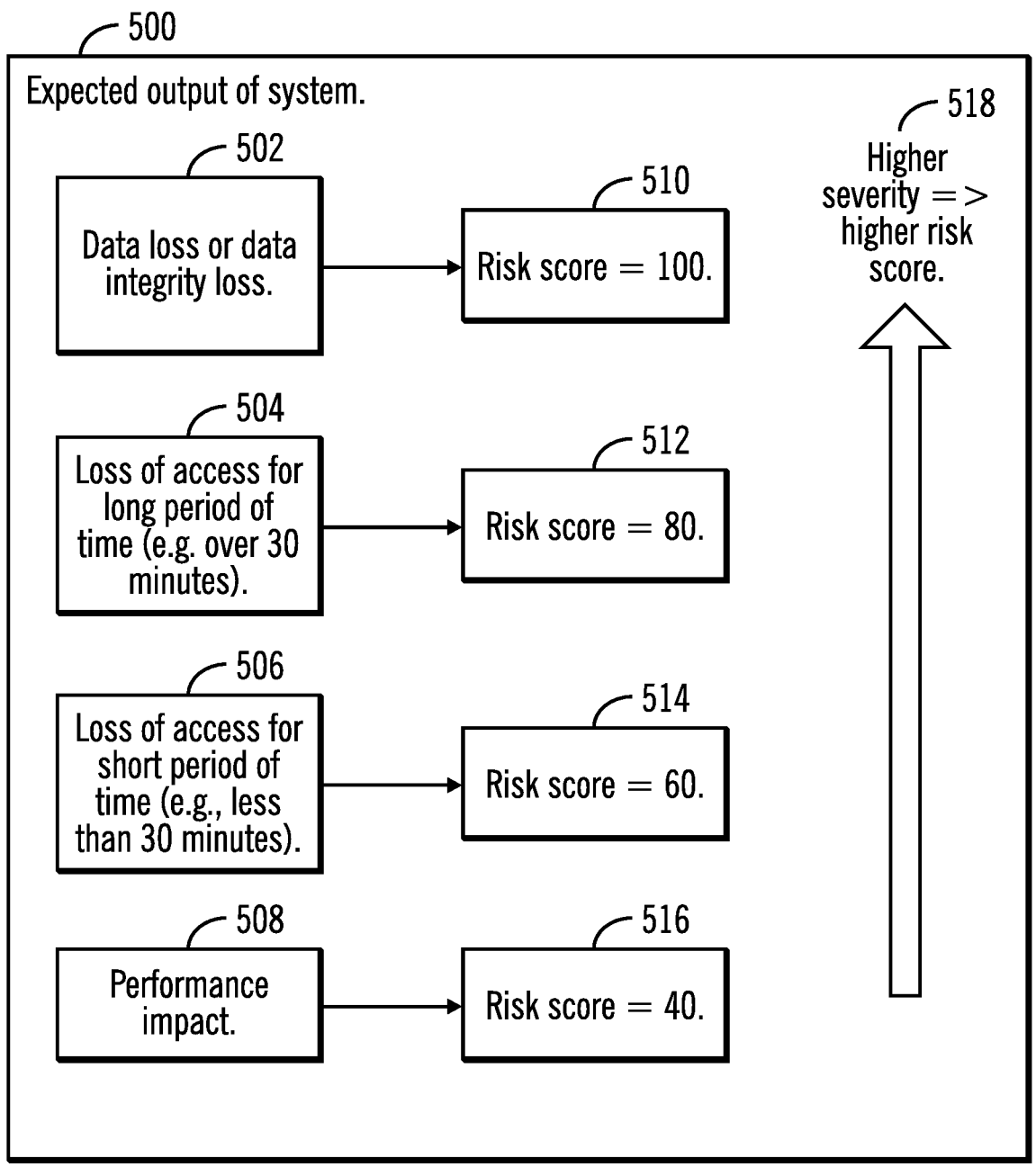
FIG. 5 illustrates a block diagram that shows how the expected output of the machine learning module is computed, in accordance with certain embodiments.

FIG. 5 illustrates a block diagram 500 that shows how the expected output for the machine learning module is computed, in accordance with certain embodiments. The expected output is a risk score where if the severity of a failure or problem is high than the risk score is high, and if the severity of a failure or problem is low then the risk score is low (as shown via reference numeral 518).

In case of a data loss or data integrity loss, a risk score of 100 is provided (as shown via reference numerals 502, 510). In case of a loss of access for a long period of time such as over 30 minutes, a risk score of 80 is expected (as shown via reference numerals 504, 512). In case of a data loss of access for a short period of time such as 30 minutes or less, a risk score of 60 is expected (as shown via reference numerals 506, 514). In case of a performance impact, a risk score of 40 is expected (as shown via reference numerals 508, 516).

The risk scores 510, 510 512, 514 comprise expected outputs of the machine learning module 106 in response to certain failures or problems. The expected output is used to compute a margin of error from a risk score computed in the machine learning module 106, to train the machine learning module.

Figure 6:
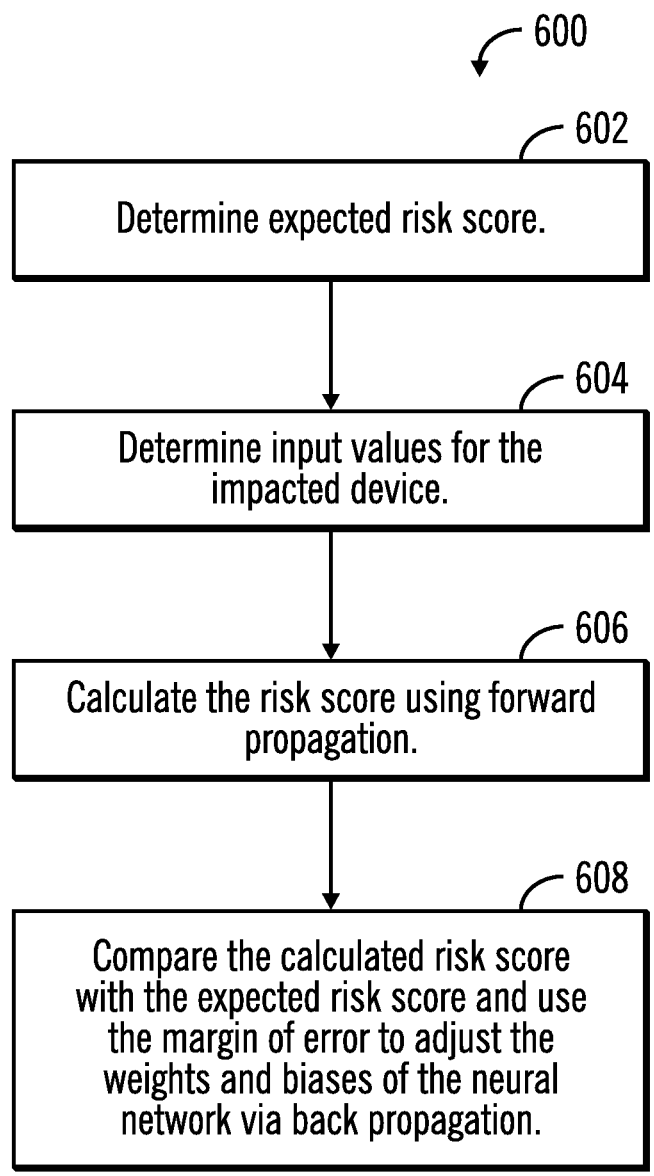
FIG. 6 illustrates a flowchart that shows how the weights and biases of the machine learning module are adjusted, in accordance with certain embodiments.

FIG. 6 illustrates a flowchart 600 that shows how the weights and biases of the machine learning module 106 are adjusted, in accordance with certain embodiments.

Control starts at block 602 in which an expected risk score is computed. A determination is made of input values for an impacted device (at block 604) and a risk score calculated using forward propagation in the machine learning module 106 (at block 606). Then the calculated risk scored is compared to the expected risk score, and the margin of error that is determined is used to adjust the weights and biases of the machine learning module 106 via back propagation (at block 608). As a result, the machine learning module 106 learns to improve its operation and calculate superior outputs in the future.

Figure 7:
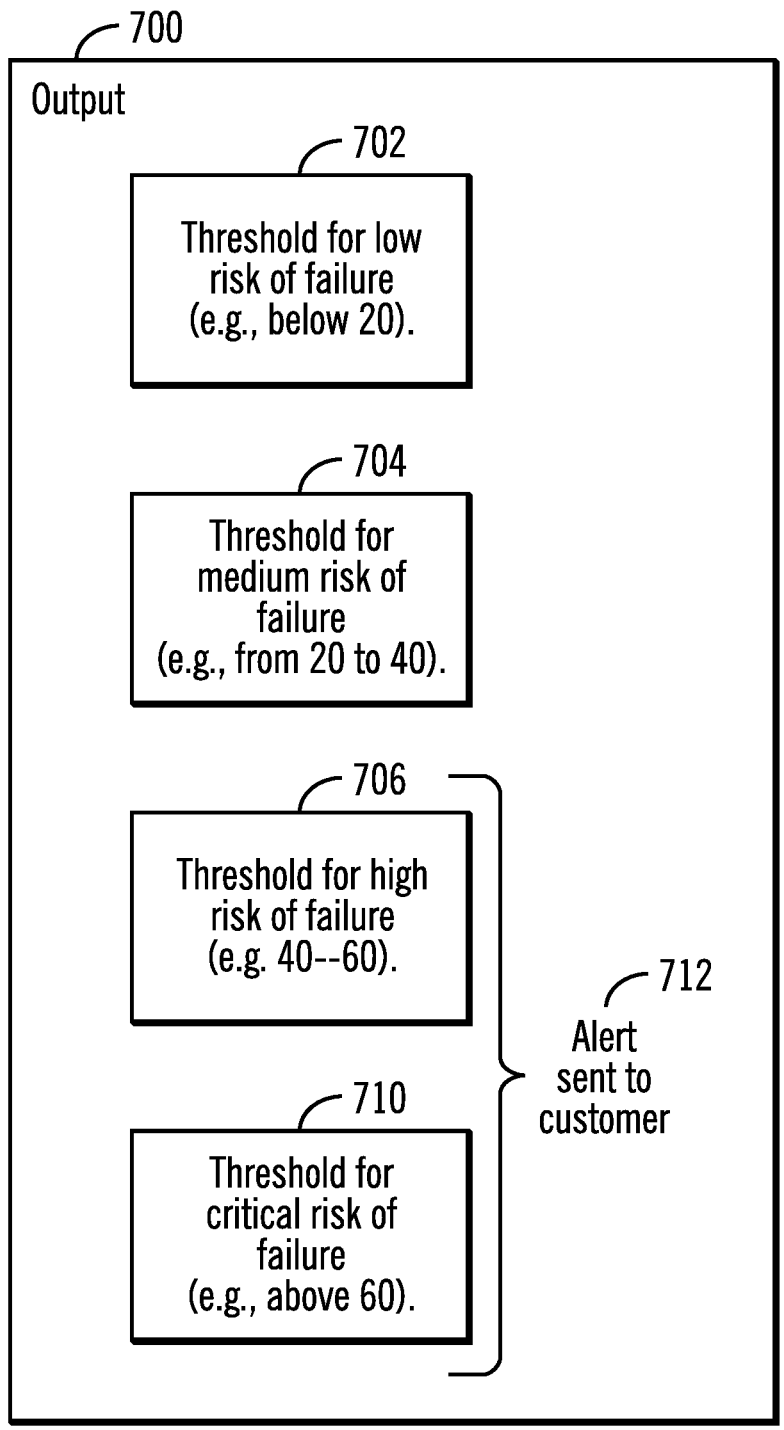
FIG. 7 illustrates a block diagram that shows how alerts are sent based on the output of the machine learning module, in accordance with certain embodiments.

FIG. 7 illustrates a block diagram 700 that shows how alerts are sent based on the output of the machine learning module 106, in accordance with certain embodiments.

After undergoing some training, the machine learning module 106 is set to a mode in which alerts may be generated. In such a mode, the output (i.e., the calculated risk score) of the machine learning module 106 is analyzed by the preemptive failure management application 104. If the output is below 20, then the preemptive failure management application 104 determines that there is a low risk of failure or other problems (reference numeral 702). If the output is between 20 and 40, then the preemptive failure management application 104 determines that there is a medium risk of failure or other problems (reference numeral 704). If the output is between 40 and 60, then the preemptive failure management application 104 determines that there is a high risk of failure or other problems (reference numeral 706). If the output is above 60, then the preemptive failure management application 104 determines that there is a critical risk of failure or other problems (reference numeral 710). If there is a high risk or critical risk of failure or other problems than an alert is sent by the preemptive failure management application 104 to the customer (as shown via reference numeral 712).

Figure 8:
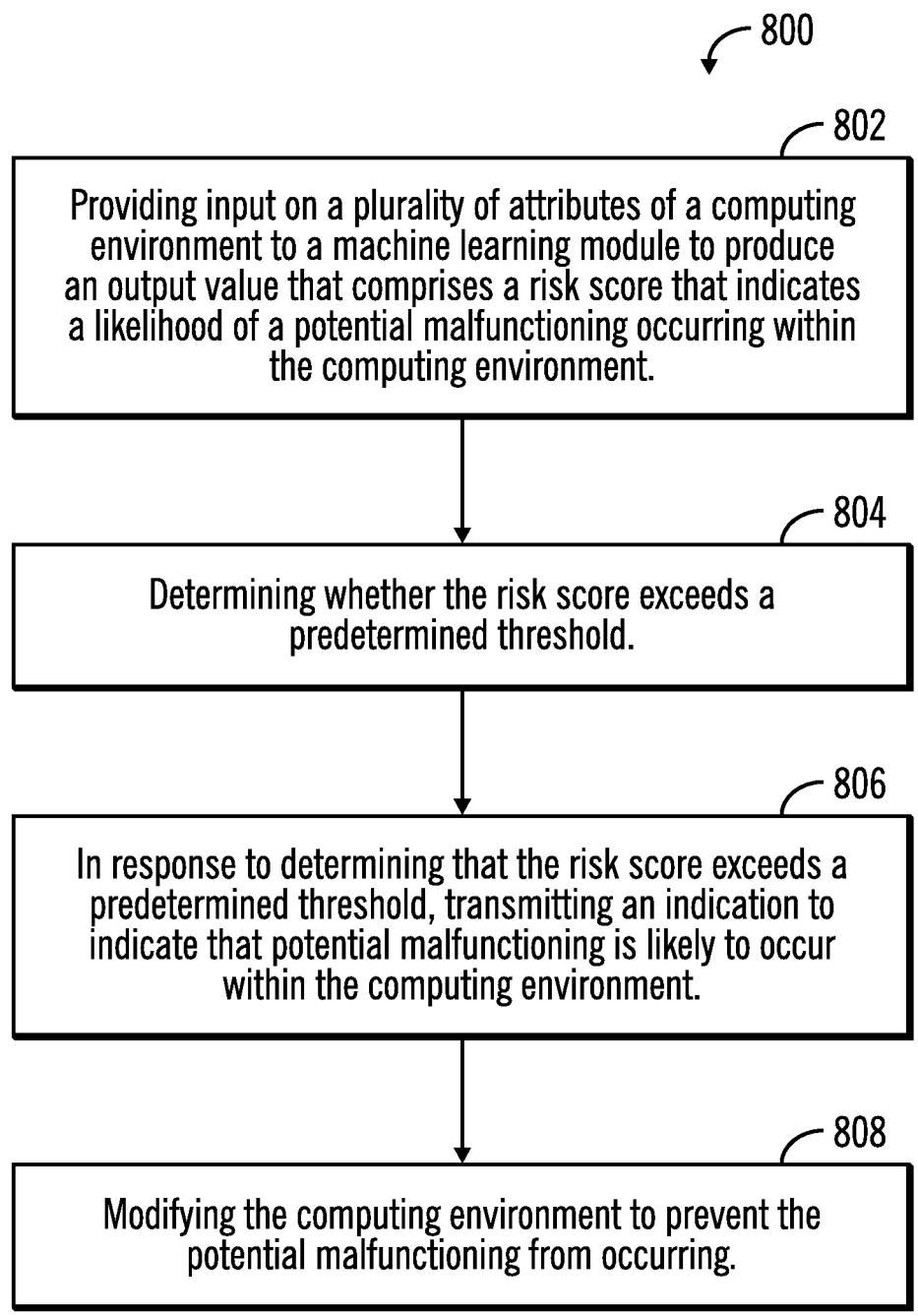
FIG. 8 illustrates a flowchart for using the machine learning module to perform preemptive identification and reduction of risk of failure in computational systems, in accordance with certain embodiments.

FIG. 8 illustrates a flowchart 800 for using the machine learning module 106 to perform preemptive identification and reduction of risk of failure in computational systems, in accordance with certain embodiments. In certain embodiments, the operations shown in FIG. 8 may be implemented in the computational device 102.

Control starts at block 802 in which input on a plurality of attributes of a computing environment is provided to a machine learning module 106 to produce an output value that comprises a risk score that indicates a likelihood of a potential malfunctioning occurring within the computing environment 100. A determination is made (at block 804) as to whether the risk score exceeds a predetermined threshold. In response to determining that the risk score exceeds a predetermined threshold, an indication is transmitted (at block 806) to indicate that potential malfunctioning is likely to occur within the computing environment 100. A modification (at block 808) is made to the computing environment to prevent the potential malfunctioning from occurring. For example, the modifications may include updating the firmware of a devices whose firmware is not at the recommended level.

Therefore, FIGS. 1-8 illustrate certain embodiments, in which a machine learning module 106 is used to predict the likelihood of failures or problems in a computing environment, and take appropriate actions prior to the occurrence of the failures or problems.

Further Details on Exemplary Inputs

In certain embodiments, the following exemplary inputs may be used as inputs to the machine learning module 106 for identifying risks in a system, where each exemplary input may have an associated weight that may be dynamically altered by using back propagation mechanisms (some of these inputs may have been described earlier in FIG. 3 with a different nomenclature):
(1) Firmware Currency Analysis based input: This is reflective of a process of tagging a device in case it is not running on a recommended firmware level, because running on a not recommended firmware level is a major cause of device failure.
(2) End of Life/End of Service (EOL/EOS) based input: The system flags a device if it has approached EOL/EOS date.
(3) N/(N−1) Analysis based input: This is based on how many hops a device current firmware level is behind the recommended level (The older the firmware level more the more vulnerable the device is likely to be).
(4) Storage Automation Tool (SAT) Policy Failure based input: A storage automation tool has the capability to check the status of health check policies on a given device. Devices having fatal and/or critical failures may result in outage and may need to be addressed immediately.
(5) Disk Currency based inputs: This is reflective of a process of flagging a drive in case it is not running at a recommended level (A drive running at outdated firmware level is more likely to cause a disk crash).
(6) Missed Heartbeat or no heartbeat based inputs: In case a device is not calling in periodically to indicate an operational status, a home system may not be able to get the current machine configuration and this may result in problems.
(7) Device Age based inputs: The older the device, the higher the risk of failure.
(8) Problematic Drive determination based inputs: Drive vintage is determined based on number of returned drives within the last 12 months. The identification of bad drives in an asset and quick replacement of such drives is a key measure in outage avoidance.
(9) Ratio of Faulty Drive based inputs: This is the ratio of the total number of faulty drives replaced to the total number of drives over a period of time. The higher the replacement rate, the more the vulnerable a device is to failure.
(10) RAID5 Identification based inputs: RAID5 configuration may result in irreversible data loss in case of double disk failures. This process highlights assets running on RAID5 configuration proactively and may greatly reduce risk of an outage.
(11) Historical Incident based inputs: If a device had an outage in the past, then the risk of failing again is greatly increased, and historical data is used to find a registered outage.
(12) High Impact Known Issues based inputs: High Impact issues that a computational device is exposed are used as inputs.

The above inputs may be grouped into two broad classes:
1. Inputs based on device level predictors: e.g., Firmware level, End of Life or End of Service, Policies, (N/N−1) Analysis, Missing heartbeat, Historical incidents, High impact known issues, device age, etc. as described above; and
2. Inputs based on component level predictors: e.g., Disk Firmware currency, problematic drives, ratio of faulty drives, drive age, RAID5, etc. as described above.

It should be noted that in alternative embodiments, many other inputs may also be used.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
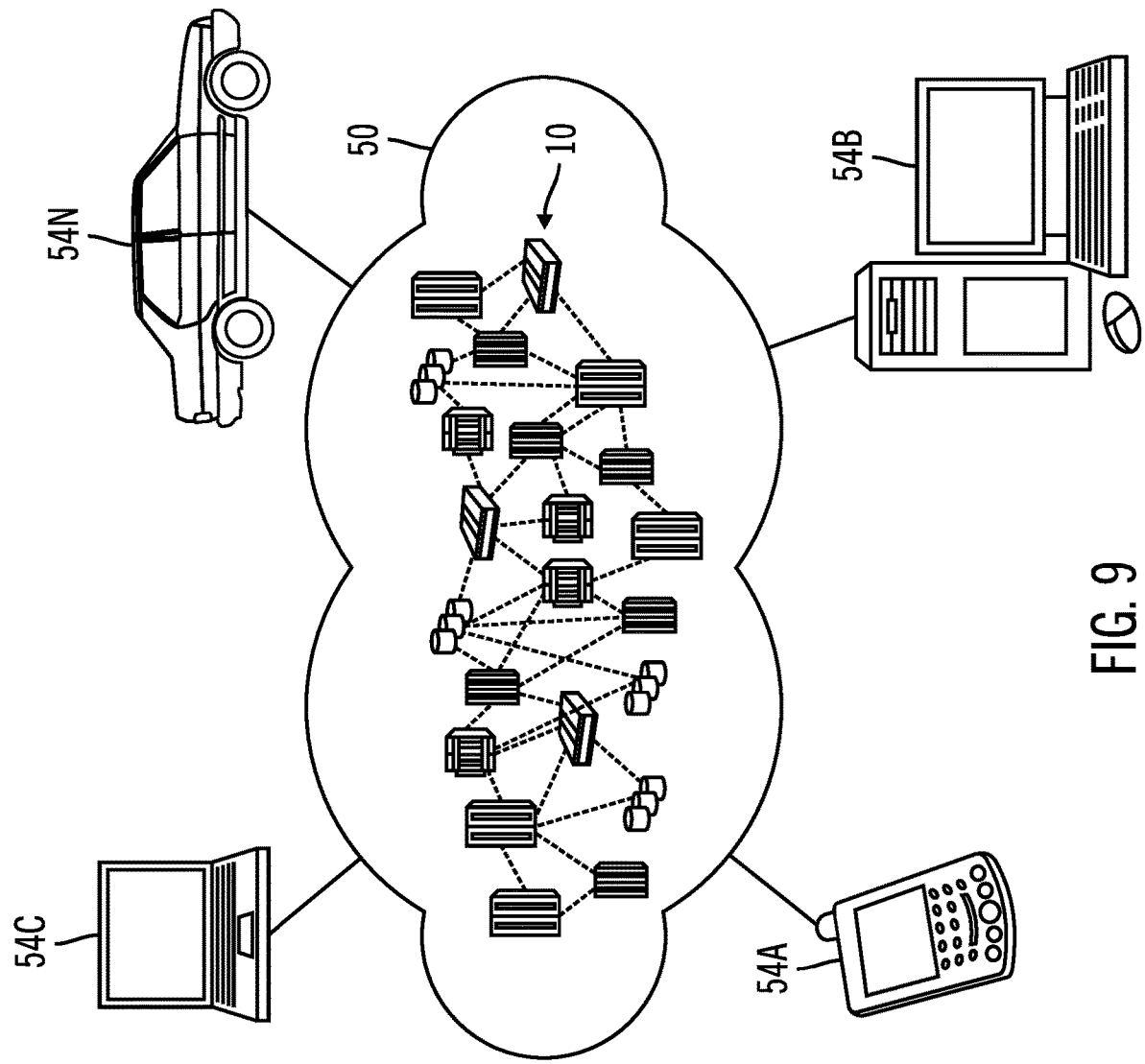
FIG. 9 illustrates a block diagram of a cloud computing environment, in accordance with certain embodiments.

Referring now to FIG. 9 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
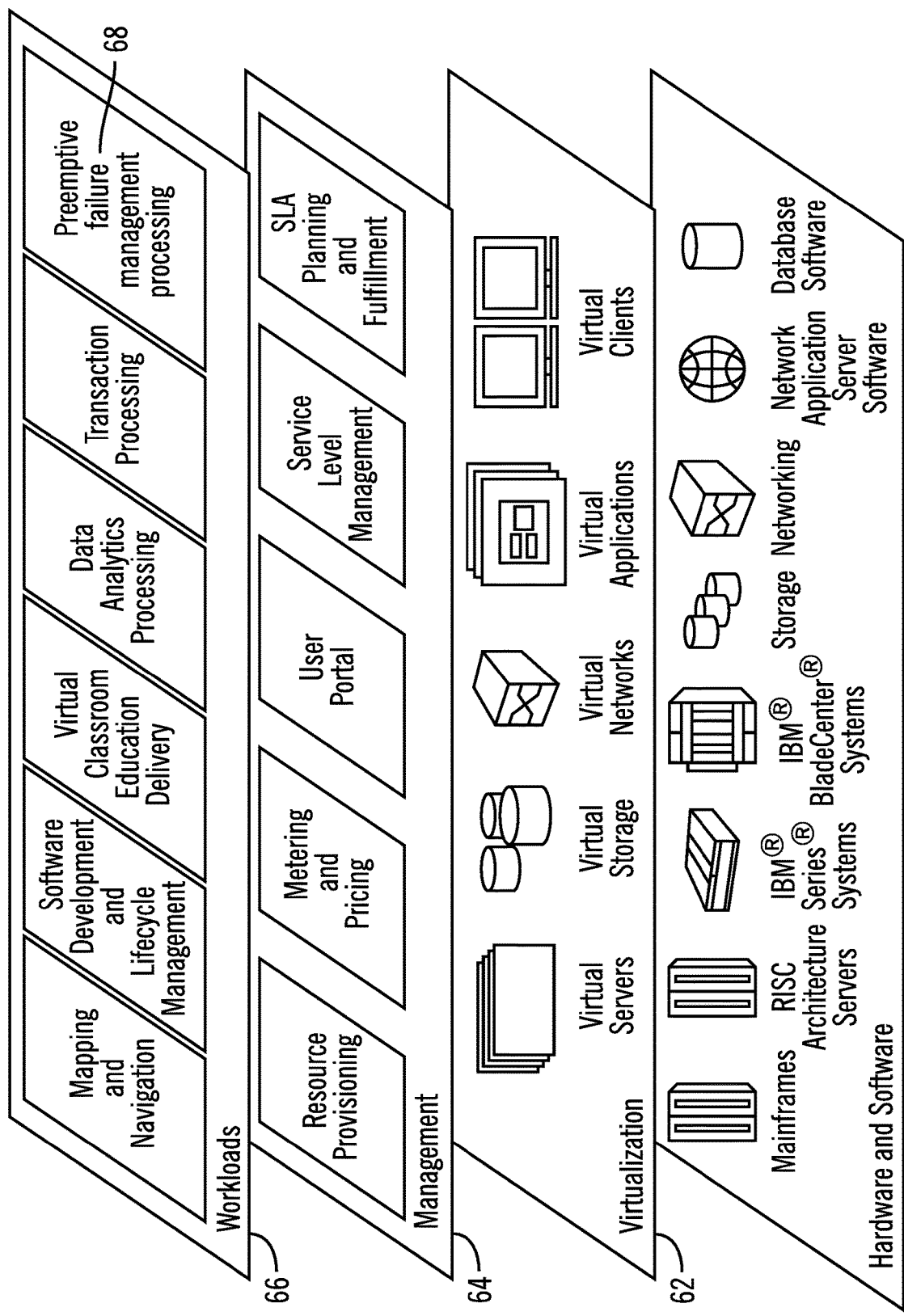
FIG. 10 illustrates a block diagram that shows further details of the cloud computing environment of FIG. 9 in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems: IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and preemptive failure management processing 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
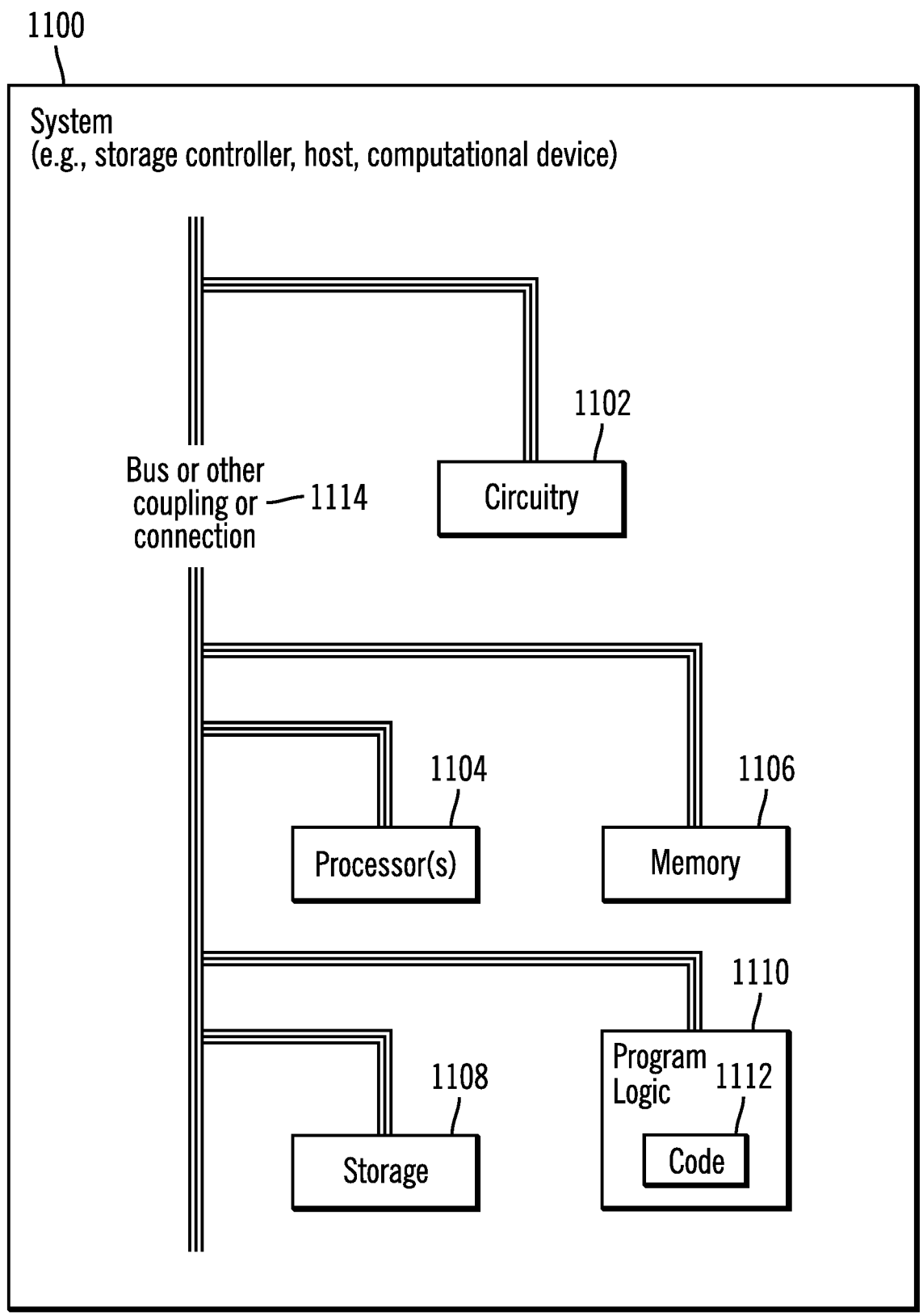
FIG. 11 illustrates a block diagram of a computational system, in accordance with certain embodiments.

FIG. 11 illustrates a block diagram that shows certain elements that may be included in the computational device 102, or other computational devices 108, 110 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including". "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing input on a plurality of attributes of a computing environment comprising one or more devices to a machine learning module to produce an output value that comprises a risk score that indicates a likelihood of a potential malfunctioning occurring within a computing environment;
determining whether the risk score exceeds a predetermined threshold;
in response to determining that the risk score exceeds a predetermined threshold, transmitting an indication to indicate that the potential malfunctioning is likely to occur within the computing environment, wherein the indication identifies a level of severity of the potential malfunctioning; and
modifying the computing environment to prevent the potential malfunctioning from occurring, wherein a first attribute of the plurality of attributes is a measure of a deviance of a firmware level of a device from a recommended firmware level for the device, wherein a greater deviance results in a greater likelihood for the potential malfunctioning caused by the device in comparison to a smaller deviance of the firmware level of the device from the recommended firmware level for the device, wherein a second attribute of the plurality of attributes is a measure of a ratio of faulty replaced drives to a total number of drives over a period of time, wherein a greater ratio of faulty replaced drives to the total number of drives results in a greater likelihood of failure in comparison to a smaller ratio of faulty replaced drives to the total number of drives, and wherein a third attribute of the plurality of attributes is a measure of an age of the device.

2. The method of claim 1, wherein the one or more devices comprise one or more storage controllers, one or more storage drives, and one or more host computing systems, wherein the one or more storage controllers manage the storage drives to allow input/output (I/O) access to the one or more host computing systems.

3. The method of claim 2, wherein an additional attribute of the plurality of attributes is based on a level of redundancy in the computing environment indicated by Redundant Array of Independent Disks (RAID) configurations.

4. The method of claim 2, wherein the plurality of attributes indicate:
whether critical policy failures have occurred in the computing environment;
whether one or more devices have missed heartbeats; and
problems identified with a device.

5. The method of claim 1, wherein the machine learning module is configured to receive the input on the plurality of attributes of the computing environment, wherein the machine learning module is trained to adjust weights within the machine learning module, in response to events occurring in the computing environment, and wherein the events are associated with an expected output value of the machine learning module.

6. A system, comprising:
a memory; and
a processor coupled to the memory, wherein the processor performs operations, the operations comprising:
providing input on a plurality of attributes of a computing environment comprising one or more devices to a machine learning module to produce an output value that comprises a risk score that indicates a likelihood of a potential malfunctioning occurring within a computing environment;
determining whether the risk score exceeds a predetermined threshold;
in response to determining that the risk score exceeds a predetermined threshold, transmitting an indication to indicate that the potential malfunctioning is likely to occur within the computing environment, wherein the indication identifies a level of severity of the potential malfunctioning; and
modifying the computing environment to prevent the potential malfunctioning from occurring, wherein a first attribute of the plurality of attributes is a measure of a deviance of a firmware level of a device from a recommended firmware level for the device, wherein a greater deviance results in a greater likelihood for the potential malfunctioning caused by the device in comparison to a smaller deviance of the firmware level of the device from the recommended firmware level for the device, wherein a second attribute of the plurality of attributes is a measure of a ratio of faulty replaced drives to a total number of drives over a period of time, wherein a greater ratio of faulty replaced drives to the total number of drives results in a greater likelihood of failure in comparison to a smaller ratio of faulty replaced drives to the total number of drives, and wherein a third attribute of the plurality of attributes is a measure of an age of the device.

7. The system of claim 6, wherein the one or more devices comprise one or more storage controllers, one or more storage drives, and one or more host computing systems, wherein the one or more storage controllers manage the storage drives to allow input/output (I/O) access to the one or more host computing systems.

8. The system of claim 7, wherein an additional attribute of the plurality of attributes is based on a level of redundancy in the computing environment indicated by Redundant Array of Independent Disks (RAID) configurations.

9. The system of claim 7, wherein the plurality of attributes indicate:
   whether critical policy failures have occurred in the computing environment;
   whether one or more devices have missed heartbeats; and
   problems identified with a device.

10. The system of claim 6, wherein the machine learning module is configured to receive the input on the plurality of attributes of the computing environment, wherein the machine learning module is trained to adjust weights within the machine learning module, in response to events occurring in the computing environment, and wherein the events are associated with an expected output value of the machine learning module.

11. A computer program product, the computer program product comprising a computer readable storage medium having computer readable program code embodied therewith, the computer readable program code configured to perform operations in a computational device, the operations comprising:
   providing input on a plurality of attributes of a computing environment comprising one or more devices to a machine learning module to produce an output value that comprises a risk score that indicates a likelihood of a potential malfunctioning occurring within a computing environment;
   determining whether the risk score exceeds a predetermined threshold;
   in response to determining that the risk score exceeds a predetermined threshold, transmitting an indication to indicate that the potential malfunctioning is likely to occur within the computing environment, wherein the indication identifies a level of severity of the potential malfunctioning; and
   modifying the computing environment to prevent the potential malfunctioning from occurring, wherein a first attribute of the plurality of attributes is a measure of a deviance of a firmware level of a device from a recommended firmware level for the device, wherein a greater deviance results in a greater likelihood for the potential malfunctioning caused by the device in comparison to a smaller deviance of the firmware level of the device from the recommended firmware level for the device, wherein a second attribute of the plurality of attributes is a measure of a ratio of faulty replaced drives to a total number of drives over a period of time, wherein a greater ratio of faulty replaced drives to the total number of drives results in a greater likelihood of failure in comparison to a smaller ratio of faulty replaced drives to the total number of drives, and wherein a third attribute of the plurality of attributes is a measure of an age of the device.

12. The computer program product of claim 11, wherein the one or more devices comprise one or more storage controllers, one or more storage drives, and one or more host computing systems, wherein the one or more storage controllers manage the storage drives to allow input/output (I/O) access to the one or more host computing systems.

13. The computer program product of claim 12, wherein an additional attribute of the plurality of attributes is based on a level of redundancy in the computing environment indicated by Redundant Array of Independent Disks (RAID) configurations.

14. The computer program product of claim 12, wherein the plurality of attributes indicate:
   whether critical policy failures have occurred in the computing environment;
   whether one or more devices have missed heartbeats; and
   problems identified with a device.

15. The computer program product of claim 11, wherein the machine learning module is configured to receive the input on the plurality of attributes of the computing environment, wherein the machine learning module is trained to adjust weights within the machine learning module, in response to events occurring in the computing environment, and wherein the events are associated with an expected output value of the machine learning module.

16. The method of claim 1, wherein a fourth attribute of the attributes is a measure of whether the device has reached an end of life cycle, and wherein a fifth attribute of the attributes is a measure of a number of devices that have missed heartbeats.

17. The system of claim 6, wherein a fourth attribute of the attributes is a measure of whether the device has reached an end of life cycle, and wherein a fifth attribute of the attributes is a measure of a number of devices that have missed heartbeats.

18. The computer program product of claim 11, wherein a fourth attribute of the attributes is a measure of whether the device has reached an end of life cycle, and wherein a fifth attribute of the attributes is a measure of a number of devices that have missed heartbeats.

* * * * *